April 27, 1926.  O. B. RIDDLE  1,582,540

VACUUM FLOW TANK AND GAS SEPARATOR

Filed Feb. 13, 1925    2 Sheets-Sheet 1

Inventor
O. B. Riddle,
By
Attorney

April 27, 1926.

O. B. RIDDLE

VACUUM FLOW TANK AND GAS SEPARATOR

Filed Feb. 13, 1925

Inventor
O. B. Riddle,

By Clarence O'Brien

Attorney

Patented Apr. 27, 1926.

1,582,540

UNITED STATES PATENT OFFICE.

OREN B. RIDDLE, OF TULSA, OKLAHOMA.

VACUUM FLOW TANK AND GAS SEPARATOR.

Application filed February 13, 1925. Serial No. 8,979.

*To all whom it may concern:*

Be it known that I, OREN B. RIDDLE, a citizen of the United States, residing at Tulsa, in the county of Tulsa and State of Oklahoma, have invented certain new and useful Improvements in Vacuum Flow Tanks and Gas Separators, of which the following is a specification.

This invention relates to a vacuum flow tank, for use in connection with oil wells, and has for its principal object to provide a simple and efficient means for separating the casing head gas from the oil, for the manufacture of gasoline.

One of the important objects of the present invention is to provide a vacuum flow tank separator of the above mentioned character, wherein means is provided for preventing any possibility of oil being admitted to the vacuum line or pipe, together with the gas drawn from the tank by the vacuum.

A further object is to provide a vacuum flow tank and gas separator of the above mentioned character, wherein means is provided for spraying the inflowing oil against the inner wall of the tank, whereby the gas will be separated therefrom, thus increasing the output of the casing head gas to an appreciable extent.

A still further object is to provide a vacuum flow tank and a gas separator of the above mentioned character, which is simple in construction, inexpensive, strong and durable, and further well adapted for the purpose for which it is designated.

Other objects and advantages of this invention will become apparent during the course of the following description.

In the accompanying drawings, forming a part of this specification, and in which like numerals indicate corresponding parts throughout the several views.

Figure 2:
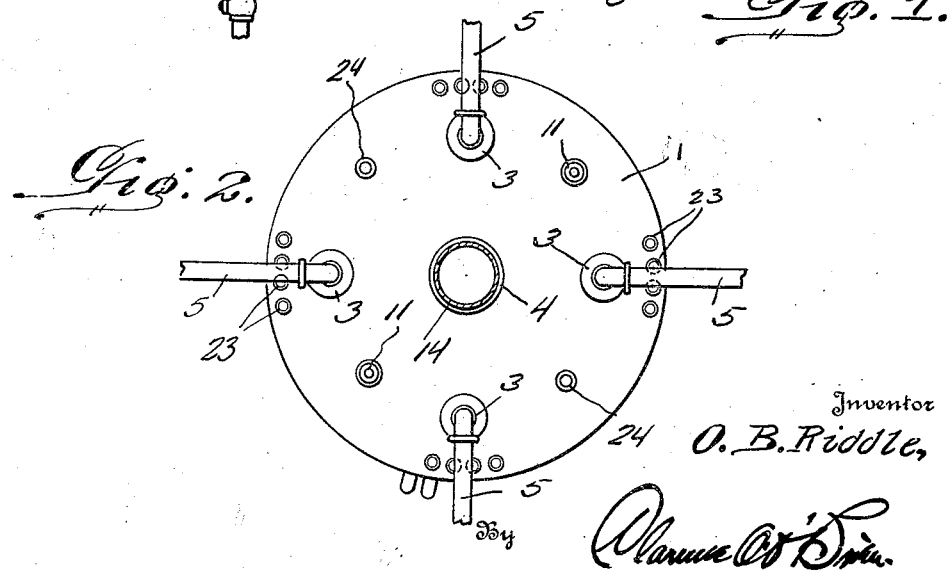
Figure 2 is a sectional view, taken approximately on the line 2—2 of Figure 1, showing the tank in plan.
Figure 3:
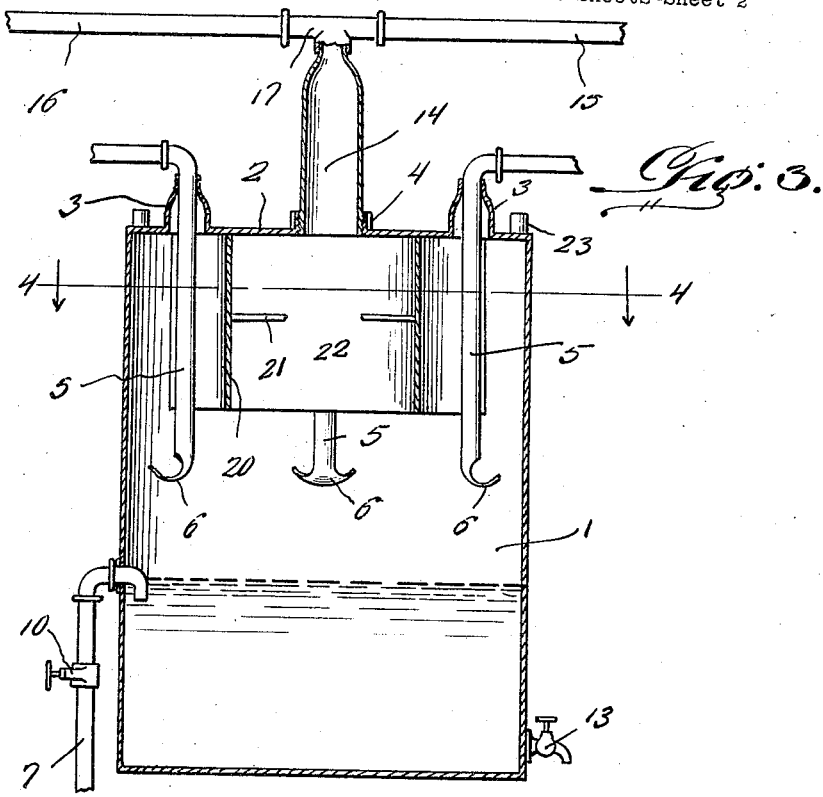
Figure 3 is a vertical sectional view, through the tank, and through the vacuum dome.

In the drawings, wherein for the purpose of illustration is shown the preferred embodiment of my invention, the numeral 1 designates the substantially cylindrical tank. Extending upwardly from the top thereof are the spaced collars 3. These collars are preferably arranged adjacent the outer edge of the top as more clearly illustrated in Figures 2 and 3 of the drawings. A centrally located collar 4 is also associated with the top 2, and the purpose thereof will be hereinafter more fully described.

Extending through the collars 3 are the oil inlet or supply pipes 5, the same providing a means whereby the oil from the wells will flow in a natural manner into the tank 1. The discharge end of each of the oil supply pipes extends downwardly into the tank 1 for a suitable distance, and terminates in the upwardly curved fan-shaped deflector 6, the purpose of which is to provide a means whereby the gas and oil will be caused to be directed upwardly against the inner wall of the tank, in the form of a spray, thus tending to separate the gas from the oil.

Figure 1:
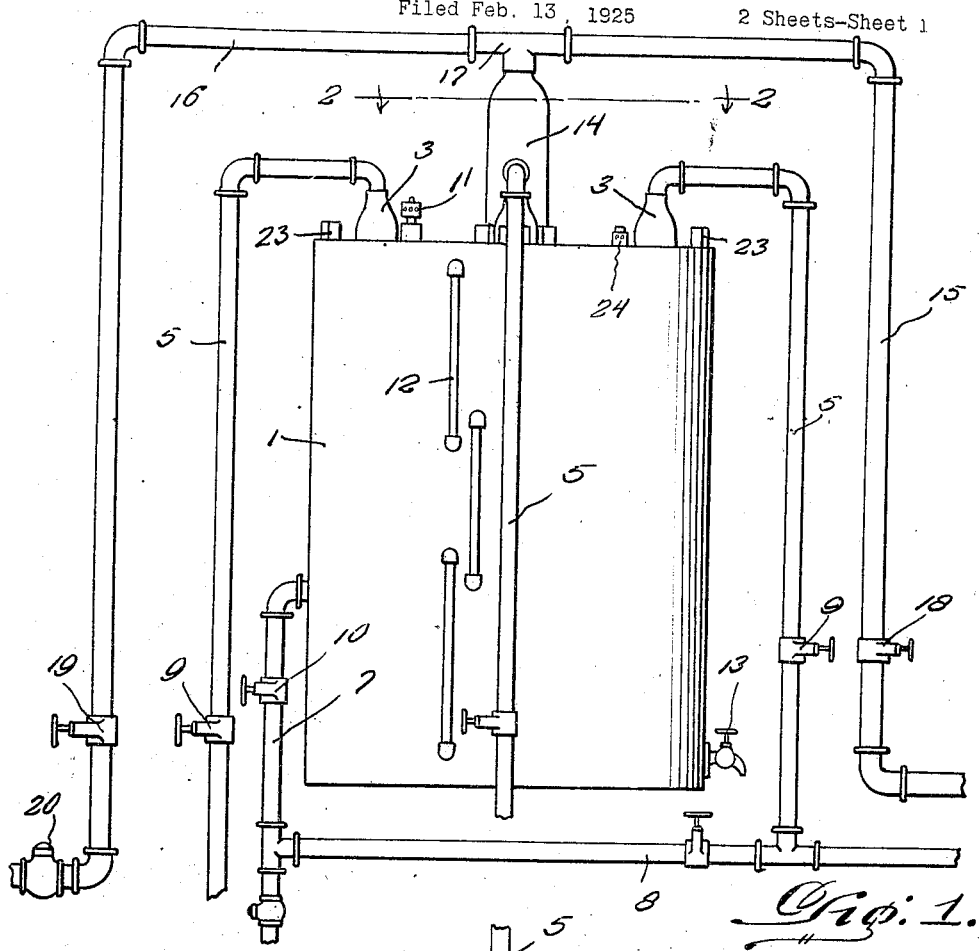
Figure 1 is a side elevation of the vacuum flow tank and gas separator embodying my invention.

The oil, which is delivered to the tank 1 may be discharged therefrom through the outlet pipe 7, the same being adapted to provide a means for delivering the oil from the tank to suitable storage tanks (not shown). A bypass pipe 8 is associated with the discharge pipe 7, and with one of the supply pipes, in a manner as illustrated more clearly in Figure 1. The supply pipes 5 are each provided with a suitable valve 9, whereby the flow of oil and gas to the tank from the well may be controlled. The outlet pipe 7 is also provided with a valve 10, whereby the flow of oil from the tank 1, through the storage tank may also be controlled.

Suitable pump valves 11, of any well-known construction are associated with the tank 1, for controlling the pressure in the tank. Also associated with the tank 1 are the gauges 12, whereby the level of the oil in the tank may be readily ascertained. A drain cock 13 is also associated with the tank 1, the same being located adjacent the bottom thereof, as clearly illustrated in Figures 1 and 3.

The vacuum apparatus, forming a part of the present invention includes a dome 14, the lower portion of which is supported in the collar 4 and has communication with the tank 1. The upper end of the dome 14 which is reduced, has communication with a gas outlet pipe 15, which leads to the gasoline plant (not shown), the upper end of the dome having further communication with the release gas pipe 16, which communicates with the atmosphere. A substantially T-shaped coupling 17 forms the connection between the upper reduced end of the dome 14 and the laterally extending pipes 15 and 16. Suitable valves 18 and 19 are associated with these gas pipes or lines 15 and 16 respectively. The release line 16 is further provided with a check valve 20, of any conventional construction.

Figure 4:
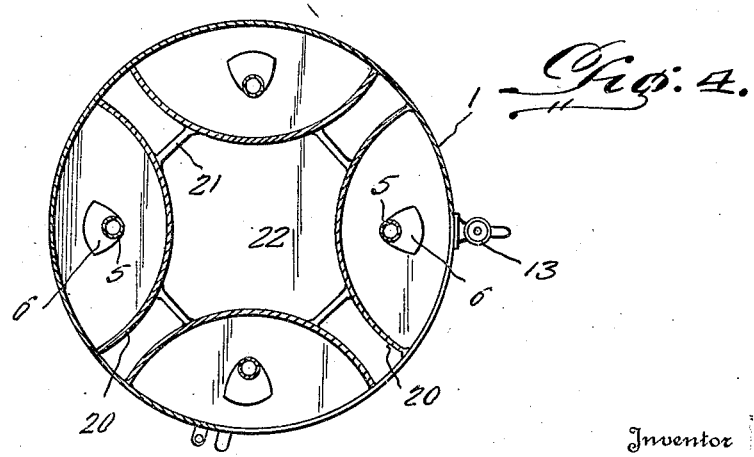
Figure 4 is a sectional view, taken approximately on line 4—4 of Figure 3.

Extending downwardly into the tank 1 from the top 2 thereof are the substantially curved baffle plates 20. The baffle plates are arranged in cooperative relation with respective portions of the oil supply pipes, which are disposed within the upper portion of the tank 1, the lower edges of the baffle plate terminating at a point slightly above the discharge ends of the supply pipes, as is clearly illustrated in Figure 3. The baffle plates are connected together, in spaced relation, through the medium of the webs 21. The side edges of each of the baffle plates engage the inner wall of the tank, as is illustrated in Figure 4. The curved baffle plates cooperate to provide a central chamber 22, which has communication with the mouth of the dome 14, for the purposes to be presently described.

The top of the tank 2 is provided with the nipple 23 adjacent the outer edge thereof, for the purpose of the insertion of pipes, in the event that the oil wells are pumped, and a natural flow of the oil from the wells cannot be obtained. In the present instance, I have shown four of such nipples disposed adjacent each of the collars 3, whereby four flow lines can be placed in the same tank as to accommodate a number of wells. Also provided in the top of the tank are the intake valves 24, the same providing a means for regulating the vacuum, in order that the tank will not buckle.

In operation, as the oil from the wells flows through the supply pipes 5, into the tank 1, the oil and gas will strike the upwardly curved deflectors 6, formed on the lower ends of the discharge portions of the supply pipe whereby the oil and gas will be sprayed upwardly against the inner wall of the tank, causing the gas to be separated from the oil. The baffle plates, which extend around the portions of the supply pipes disposed within the tank 1 will prevent any possibility of oil being admitted to the mouth of the dome 14 of the vacuum apparatus, thus insuring only the flow of gas from the tank upwardly through the dome and through the pipe 15, to the gasoline receiving plant. In this manner, casing head gas will be reclaimed, in a simple and efficient manner. Heretofore considerable difficulty has been experienced in attempting to prevent the oil itself from entering into the vacuum together with the casing head gas, and as a result, the gas line will oftentimes become clogged with the liquid. The provision of the baffle plates will prevent any possibility of any oil entering the dome, thus insuring the separation of the gas from the oil. Furthermore, the provision of the fan shaped deflector on the discharge end of the supply pipe will separate the gas from the oil, in such a manner as to increase the output of the casing head gas to an appreciable extent.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. An apparatus for separating casing head gas from oil comprising a tank, oil supply pipes extending downwardly into the tank, and upwardly directed deflectors on the discharge end of the supply pipes for spraying the oil against the inner wall of the tank, whereby the gas is separated from the oil.

2. An apparatus for separating casing head gas from oil comprising a tank having a gas outlet, oil supply pipes extending downwardly into the tank, upwardly directed deflectors on the discharge ends of the supply pipes for spraying the oil against the inner wall of the tank, additional means for separating the gas from the oil and preventing the oil entering the gas outlet.

3. An apparatus for separating casing head gas from oil comprising a tank having a gas outlet, oil supply pipes extending downwardly into the tank, upwardly directed deflectors on the discharge ends of the supply pipes for spraying the oil against the inner wall of the tank, additional means for separating the gas from the oil and preventing the oil entering the gas outlet, said means comprising baffle plates extending downwardly from the top of the tank around the supply pipes.

4. An apparatus for separating casing head gas from oil comprising a tank having a gas outlet, oil supply pipes extending downwardly into the tank, upwardly directed deflectors on the discharge ends of the supply pipes for spraying the oil against the inner wall of the tank, additional means for separating the gas from the oil and preventing the oil entering the gas outlet, said means comprising a series of vertically arranged curved baffle plates extending downwardly from the top of the tank and terminating at a point adjacent the lower ends of the respective supply pipes, each of said baffle plate being curved and extending around the adjacent respective supply pipe, and bracing means between the baffle plates.

5. An apparatus for separating casing head gas from oil comprising a tank, oil supply pipes extending downwardly into said tank, the discharge end of each pipe terminating in an upwardly curved fan-shaped deflector whereby the oil will be sprayed against the inner wall of the tank.

In testimony whereof I affix my signature.

OREN B. RIDDLE.